United States Patent
Jung et al.

(10) Patent No.: US 8,164,246 B2
(45) Date of Patent: Apr. 24, 2012

(54) LIGHT EMISSION DEVICE AND DISPLAY DEVICE USING THE SAME AS LIGHT SOURCE

(75) Inventors: Kyu-Won Jung, Suwon-si (KR); Hun-Soo Kim, Suwon-si (KR); Sang-Jin Lee, Suwon-si (KR); Ii-Hwan Kim, Suwon-si (KR); Chang-Soo Lee, Suwon-si (KR); Myung-Ick Hwang, Suwon-si (KR); Hyeong-Rae Seon, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 418 days.

(21) Appl. No.: 12/265,682

(22) Filed: Nov. 5, 2008

(65) Prior Publication Data

US 2009/0175027 A1    Jul. 9, 2009

(30) Foreign Application Priority Data

Jan. 9, 2008   (KR) .................. 10-2008-0002571

(51) Int. Cl.
*H01J 1/46*     (2006.01)
*H01J 1/00*     (2006.01)
(52) U.S. Cl. ................. 313/495; 313/496; 313/497
(58) Field of Classification Search .......... 313/309, 313/311, 495–498; 445/23–25
See application file for complete search history.

(56) References Cited

U.S. PATENT DOCUMENTS 5,424,605 A * 6/1995 Lovoi ...................... 313/422
7,541,732 B2   6/2009 Ahn
7,663,297 B2   2/2010 Ryu et al.
2002/0167266 A1 * 11/2002 Hirasawa et al. .......... 313/496
2004/0150311 A1 * 8/2004 Jin ........................... 313/309
2005/0184634 A1   8/2005 Ahn
(Continued)

FOREIGN PATENT DOCUMENTS

CN        1702800 A      11/2005
(Continued)

OTHER PUBLICATIONS

Office action dated Dec. 25, 2009 for corresponding Chinese Patent Application No. 200910001645.6.
(Continued)

*Primary Examiner* — Joseph L Williams
*Assistant Examiner* — Nathaniel Lee
(74) *Attorney, Agent, or Firm* — Christie, Parker & Hale, LLP

(57) ABSTRACT

A light emission device for simplifying a structure of an electron emission unit and a manufacturing process thereof is provided. A display device using the light emission device as a light source is also provided. The light emission device includes a vacuum panel having a first substrate and a second substrate facing each other. A sealing member is between the first and second substrates. Recess portions each have a depth into a side of the first substrate facing the second substrate. Cathode electrodes are in corresponding recesses. Electron emission regions are on corresponding cathode electrodes. A gate electrode is fixed at one side of the first substrate at a distance from the electron emission regions. A light emission unit is at one side of the second substrate. The gate electrode includes a mesh unit having openings for passing through an electron beam and a supporting member surrounding the mesh unit.

23 Claims, 14 Drawing Sheets

U.S. PATENT DOCUMENTS

| | | |
|---|---|---|
| 2006/0017363 A1 | 1/2006 | Wei et al. |
| 2006/0066214 A1 | 3/2006 | Chen et al. |
| 2006/0125375 A1* | 6/2006 | Hwang et al. ............ 313/496 |
| 2007/0228930 A1 | 10/2007 | Yoo et al. |
| 2007/0267961 A1 | 11/2007 | Ryu et al. |

FOREIGN PATENT DOCUMENTS

| | | |
|---|---|---|
| CN | 101075543 A | 11/2007 |
| JP | 9-55174 | 2/1997 |
| JP | 2003-77410 | 3/2003 |
| JP | 2004-79450 | 3/2004 |
| JP | 2004-178891 | 6/2004 |
| JP | 2005-85581 | 3/2005 |
| JP | 2005-243641 | 9/2005 |
| JP | 2005-310648 | 11/2005 |
| JP | 2006-156098 | 6/2006 |
| JP | 2007-311355 | 11/2007 |
| KR | 2000-0010835 | 2/2000 |
| KR | 10-2004-0032761 | 4/2004 |
| KR | 10-2006-0060482 | 6/2006 |

OTHER PUBLICATIONS

European Search Report dated Apr. 29, 2009, for corresponding European application 09150136.1, noting listed references in this IDS.

European Search Report dated Sep. 24, 2009, for corresponding European application 09150136.1, noting listed reference in this IDS, as well as U.S. Publications previously filed in an IDS dated Jul. 6, 2009.

Extended European Search Report dated Dec. 6, 2010, for corresponding European Patent application 09150136.1.

JPO Office Action dated Oct. 4, 2011, for corresponding JP Patent Application No. 2009-001448, 3 pages.

* cited by examiner

LIGHT EMISSION DEVICE AND DISPLAY DEVICE USING THE SAME AS LIGHT SOURCE

CROSS-REFERENCE TO RELATED APPLICATION

This application claims priority to and the benefit of Korean Patent Application No. 10-2008-0002571 filed in the Korean Intellectual Property Office on Jan. 9, 2008, the entire contents of which are incorporated herein by reference.

BACKGROUND OF THE INVENTION

1. Field of the Invention

The present invention relates to a light emission device and a display device using the light emission device as a light source. More particularly, the present invention relates to an electron emission unit in a light emission device and that emits electrons toward a phosphor layer.

2. Description of the Related Art

There are many different types of light emission devices that radiate visible light. Some light emission devices include an anode electrode and a phosphor layer on a front substrate and an electron emission region and driving electrodes on a rear substrate. The front and rear substrates are sealed to each other at their peripheries using a sealing member and the inner space between the front and rear substrates is exhausted to form a vacuum panel.

The driving electrodes include cathode electrodes and gate electrodes above the cathode electrodes in a direction crossing the cathode electrodes with an insulation layer therebetween. An opening is formed in the gate electrode and the insulation layer at each crossing area of the cathode electrodes and the gate electrodes, and an electron emission region is on a corresponding cathode electrode in the opening of the insulation layer. The driving electrodes and the electron emission regions form an electron emission unit.

When a predetermined driving voltage is applied to the cathode electrodes and the gate electrodes, an electric field is formed around the electron emission region by the voltage difference between the two electrodes. As a result, electrons are emitted from the electron emission region. The emitted electrons are attracted to a high voltage applied to the anode electrode, collide with the phosphor layer, and excite the phosphor layer to emit visible light.

The electron emission unit having the above-described structure is typically manufactured by repeating a thin film process and a thick film process several times. A well-known manufacturing method for the electron emission unit includes: (i) forming cathode electrodes by coating a metal layer on a rear substrate through a thin film process such as sputtering or vacuum deposition and patterning the metal layer; (ii) forming an insulation layer by repeating screen printing, drying, and baking an insulating material several times; (iii) forming gate electrodes by coating a metal layer on the insulation layer again through a thin film process and patterning the metal layer; (iv) forming an opening by wet-etching a predetermined part of the gate electrodes and the insulation layer; and (v) forming electron emission regions by screen-printing, drying, and baking a paste mixture having electron emission materials inside the insulation layer opening and activating the surface thereof.

As described above, the method for manufacturing the electron emission unit becomes very complicated. Since it is important to align a member formed in a current process with members formed in previous processes, additional efforts are required to check the alignment of the members. Therefore, a large amount of time and cost are required for manufacturing the conventional electron emission unit.

Also, some electrons collide with a side wall of an insulating layer opening so as to apply an electric charge thereto, because an initial angle spread of an electron beam is comparatively large when an electron emission region emits electrons in the electron emission unit. The resulting electric charge at the insulation layer lowers withstanding voltage characteristics of the cathode electrode and the gate electrode, thereby seriously deteriorating the driving stability of the light emission device.

SUMMARY OF THE INVENTION

In accordance with the present invention a light emission device is provided which simplifies its manufacturing process and lowers its manufacturing cost by improving the structure of an electron emission unit and improving driving stability by improving withstanding voltage characteristics of a cathode electrode and a gate electrode. A display device is also provided having the light emission device in accordance with the present invention as a light source.

The display device may include a display panel having first pixels. The light emission device may include a number of second pixels that is fewer than the first pixels. Each of the second pixels may independently emit light corresponding to grayscales of corresponding first pixels. The second pixel may emit light corresponding to a highest grayscale among grayscales of corresponding first pixels.

The display panel may be a liquid crystal display panel.

In the above exemplary embodiments the light emission device includes a vacuum panel having a first substrate and a second substrate facing each other and a sealing member between the first and second substrates. The first substrate has recesses for a side of the first substrate facing the second substrate. Cathode electrodes are in corresponding recesses. Electron emission regions are on corresponding cathode electrodes. A gate electrode is fixed at one side of the first substrate at a distance from the electron emission regions. The gate electrode includes a mesh unit having openings for passing through an electron beam and a supporting member surrounding the mesh unit. A light emission unit is at one side of the second substrate.

In the above exemplary embodiments the recesses may have a wider width than that of the cathode electrode, and a depth greater than the sum of thicknesses of the cathode electrode and the electron emission region.

In the above exemplary embodiments the gate electrode may be made of a metal plate having a greater thickness than that of the cathode electrode. An edge of the gate electrode may be exposed to the outside of the sealing member, and the gate electrode may be fixed at the first substrate under pressure from the sealing member.

In the above exemplary embodiments the gate electrode may be made of a plurality of metal plate. The metal plates may be spaced apart in a stripe pattern along a direction crossing the cathode electrodes. The mesh unit may be in each of the gate electrodes in a one by one manner. A plurality of the mesh units may correspond to crossing areas of the cathode electrodes and the gate electrodes.

In the above exemplary embodiments the first substrate and the second substrate may include a light emitting region and a non-light emitting region. The gate electrode may be made of single metal plate. The mesh unit may correspond to the entire light emitting region.

In the above exemplary embodiments the light emission device may further include a magnetic sheet adhered on the other side of the first substrate for fixing the gate electrode at the first substrate. The first substrate may form a protrusion. The supporting member of the gate electrode may form a through-hole corresponding to the protrusion. The protrusion may be inserted into the through-hole.

DETAILED DESCRIPTION OF THE EMBODIMENTS

Figure 1:
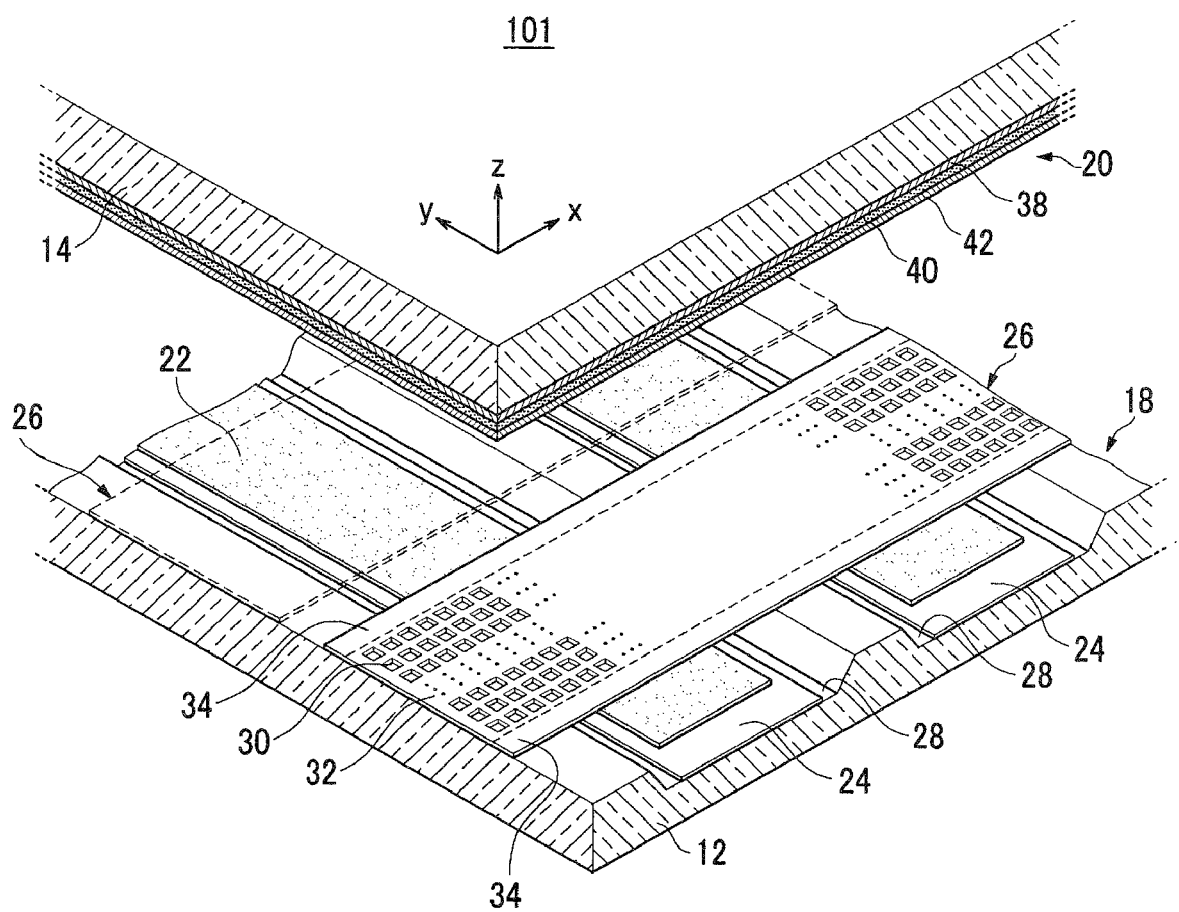
FIG. 1 is a partial cut-away perspective view of a light emission device according to a first exemplary embodiment of the present invention.
Figure 2:
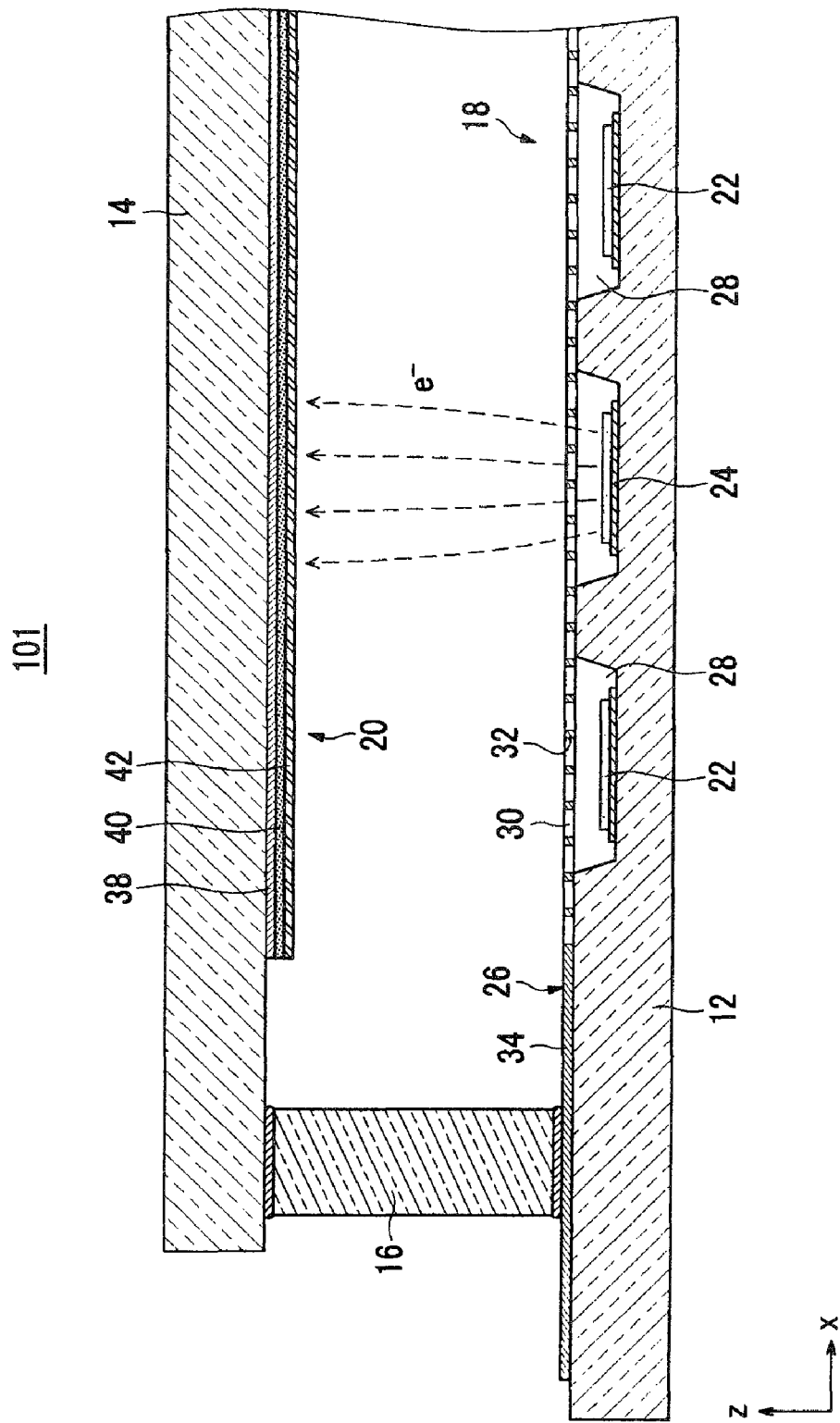
FIG. 2 is a cross-sectional view of a light emission device according to the first exemplary embodiment of the present invention.

Referring to FIG. 1 and FIG. 2, the light emission device 101 according to the present exemplary embodiment includes a vacuum panel. The vacuum panel includes a first substrate 12 and a second substrate 14 facing each other, and a sealing member 16 between the first and second substrates 12, 14 for bonding the first and second substrates 12, 14 together. The inside of the vacuum panel is sustained at a vacuum degree of about $10^{-6}$ Torr.

In the first and second substrates 12, 14, a region within the sealing member 16 is divided into a light emitting region for emitting visible light and a non-light emitting region surrounding the light emitting region. An electron emission unit 18 for emitting electrons is located at the light emitting region in the first substrate 12, and a light emission unit 20 for emitting visible light is located in the light emitting region in the second substrate 14.

The second substrate 14 having the light emission unit 20 may be a front substrate of the light emission device 101.

The electron emission unit 18 includes electron emission regions 22 and driving electrodes for controlling the amount of emission current of the electron emission regions 22. The driving electrodes include cathode electrodes 24 formed in a stripe pattern along one direction of the first substrate 12 (y-axis direction in FIG. 1), and gate electrodes 26 formed above the cathode electrodes 24 in a stripe pattern along a direction crossing the cathode electrodes 24 (x-axis direction in FIG. 1).

The first substrate 12 includes recesses 28 having a predetermined depth at an inside surface thereof that faces the second substrate 14, and the cathode electrodes 24 are located at the bottom surface of respective recesses 28. The recesses 28 are formed by removing a predetermined part of the first substrate 12 through etching or sandblasting. The recesses 28 are formed in a stripe pattern along a length direction of the cathode electrodes 24.

Each recess 28 is formed to have a wider width than that of its respective cathode electrode 24 and to have a deeper depth than the sum of thicknesses of the cathode electrode 24 and the electron emission region 22. The recess 28 may have a vertical side wall or an inclined side wall. As an example, the recess 28 has an inclined side wall in FIG. 1 and FIG. 2.

The first substrate 12 may be formed at a thickness of about 1.8 mm, and the recess 28 may be formed to have a depth of about 40 μm of and a maximum width of about 300 to 600 μm.

The cathode electrodes 24, at the bottom side of the recesses 28, are lower than a top side of the first substrate 12 by a predetermined height. Here, the top side of the first substrate 12 is the inside surface of the first substrate 12 where the recesses 28 are not formed. A part of the first substrate 12, between the recesses 28, operates as a wall for isolating cathode electrodes 24 from adjacent cathode electrodes 24.

The electron emission regions 22 may be formed above the cathode electrodes 24 in a stripe pattern in parallel with the cathode electrodes 24. The electron emission regions 22 include electron emission materials that emit electrons when an electric field is applied thereto in a vacuum state. For example, the materials may be carbon materials or nanometer-sized materials. For example, the electron emission regions 22 may include one selected from the group consisting of carbon nanotubes, graphite, graphite nanofiber, diamond, diamond-like carbon, fullerene ($C_{60}$), silicon nanowire, and combinations thereof.

An electron emission region 22 is an electron emission layer having a predetermined thickness. An electron emission region 22 may be formed through a thick film process such as screen-printing. That is, the electron emission region 22 is formed by (i) screen-printing a paste mixture having electron emission materials on the cathode electrode 24, (ii) drying and baking the printed mixture, and (iii) activating a surface of the electron emission region 22 to expose the electron emission materials through the surface of the electron emission region 22.

The surface of the electron emission regions 22 can be activated by adhering an adhesive tape (not shown) on the first substrate 12 and removing the adhesive tape from the first substrate 12. It is possible to vertically erect the electron emission materials such as carbon nanotubes on the surface of the electron emission region 22 by removing a predetermined part of the surface of the electron emission region 22 through the surface activation.

Since the depth of the recesses 28 is greater than the sum of the thicknesses of the cathode electrode 24 and the electron emission region 22, the electron emission region 22 is also lower than the top side of the first substrate 12, at a predetermined height.

The gate electrode 26 is made of a metal plate having a thicker thickness than that of the cathode electrode 24. The gate electrode 26 includes a mesh unit 32 forming openings 30 for passing through electron beams and a supporting member 34 for surrounding the mesh unit 32. For example, the gate electrode 26 may be manufactured by cutting a metal plate in a form of a stripe and forming the openings 30 through removing a predetermined part of the metal plate through etching.

The gate electrode 26 may be made of a nickel-iron alloy or another metal material. The gate electrode 26 may be formed to have a thickness of about 50 μm and a width of about 10 mm.

The gate electrode 26 is manufactured through a process that is independent from the process for forming the cathode electrode 24 and the electron emission region 22. After forming the gate electrode 26, the gate electrode 26 is fixed on the first substrate 12 along a direction crossing the cathode electrode 24. Here, the cathode electrode 24 is automatically insulated from the gate electrode 26 by fixing the gate electrode 26 at the first substrate 12 because the cathode electrode 24 and the electron emission region 22 are located on the recess 28 of the first substrate 12.

Also, the mesh unit 32 of the gate electrode 26 may be formed not only around areas overlapping with the cathode electrode 24, but also around areas not overlapping with the cathode electrode 24. That is, one mesh unit 32 may be provided for each gate electrode 26. In this case, it is advantageously not necessary to align the gate electrode 26 to the cathode electrode 24 when the gate electrode 26 is fixed on the first substrate 12.

Figure 3:
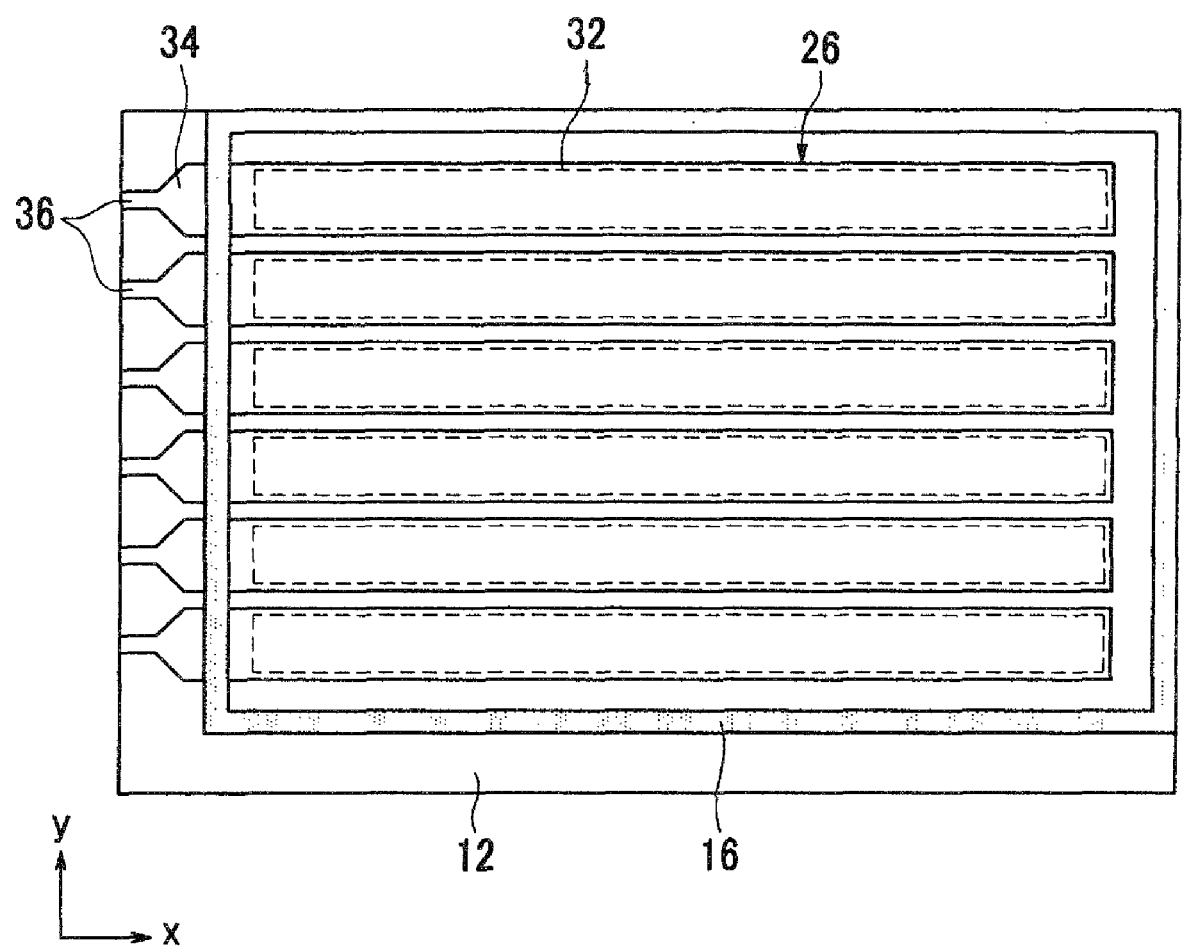
FIG. 3 and FIG. 4 are schematic diagrams illustrating a first substrate, gate electrodes, and a sealing member in the light emission device shown in FIG. 1 and FIG. 2.
Figure 4:
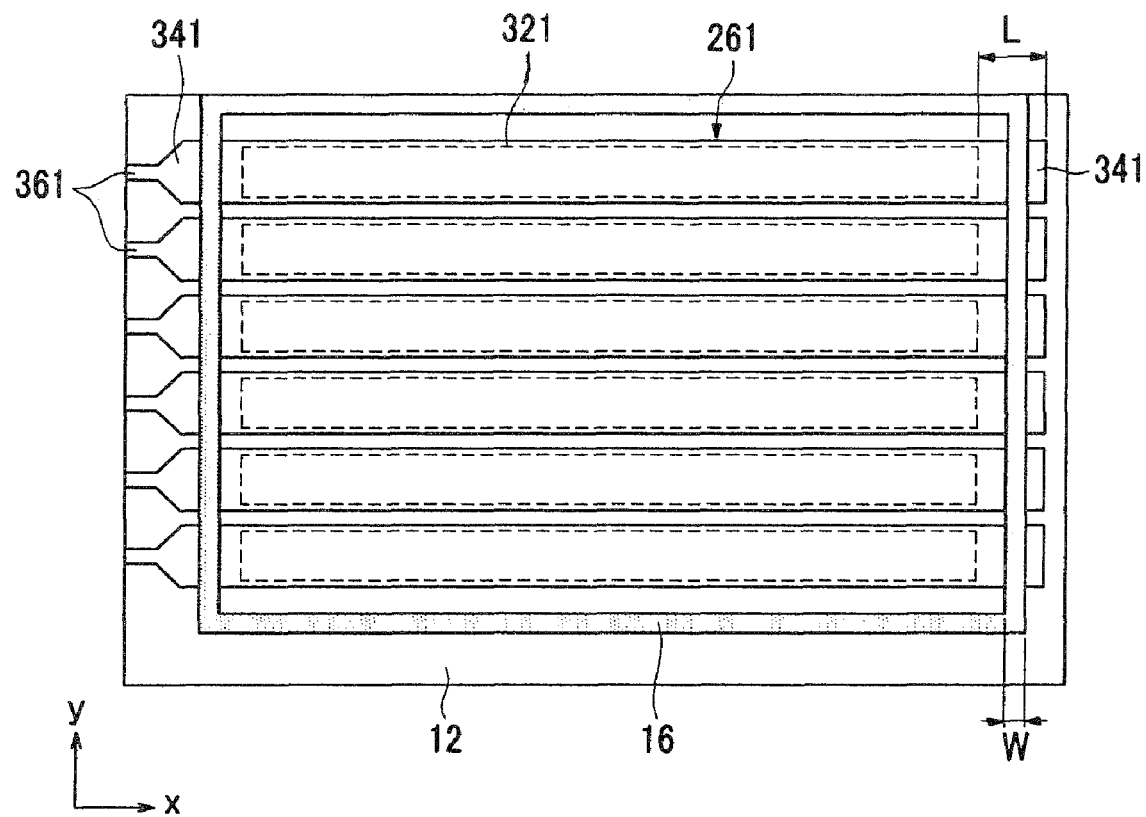

The gate electrodes 26 may be fixed at the first substrate 12 using the sealing member 16 without additional fixing means. FIG. 3 and FIG. 4 are schematic diagrams illustrating a first substrate, gate electrodes, and a sealing member in the light emission device shown in FIG. 1.

Referring to FIG. 3, the gate electrode 26 includes a terminal 36 for applying a voltage at one end of the supporting member 34. The gate electrodes 26 have the terminals 36 aligned along the edge of one side of the first substrate 12. The sealing member 16 is located above the gate electrodes 26. The sealing member 16 may cross the supporting member 34 between the terminal 36 and the mesh unit 32.

Therefore, the gate electrode 26 exposes one side end of the supporting member 34 connected to the terminal 36 to the outside of the sealing member 16. The gate electrode 26 may be fixed at the first substrate 12 by the adhesive force and the compression force of the sealing member 16.

Referring to FIG. 4, the sealing member 16 according to another exemplary embodiment may cross not only the supporting member 341 between the terminal 361 and the mesh unit 321, but also the supporting member 341 of the opposite end. For this, the supporting member 341 has a length L that is longer than a width W of the sealing member 16 by elongating the supporting member 341 at the opposite end where the terminal 361 is not formed in the gate electrode 261.

In this case, the gate electrode 261 exposes both ends of the supporting member 341 to the outside of the sealing member 16. Also, the gate electrode 261 may be fixed at the first substrate 12 by the compression force and the adhesive force of the sealing member 16.

Referring back to FIGS. 1 and 2, one crossing area of the cathode electrode 24 and the gate electrode 26 may be located on one pixel region of the light emission device 101, or more than two crossing areas may be located at one pixel region of the light emission device 101. In the second case, the cathode electrodes 24 or the gate electrodes 26 in one pixel region are electrically connected to each other, thereby receiving the same voltage.

The light emission unit 20 includes an anode electrode 38 formed on the inside of the second substrate 14, a phosphor layer 40 formed on one side of the anode electrode 38, and a reflective layer 42 covering the phosphor layer 40.

The anode electrode 38 is made of a transparent conductive material such as indium tin oxide (ITO) for transmitting visible light emitted from the phosphor layer 40. The anode electrode 38 is an acceleration electrode that attracts the electron beam. The anode electrode 38 receives more than several thousand volts of DC voltage (anode voltage), and sustains the phosphor layer 40 at a high potential state.

The phosphor layer 40 may be a phosphor mixture that emits white light. The phosphor mixture is a mixture of red phosphor, green phosphor, and blue phosphor. The phosphor layer 40 may be formed on the entire light emitting region of the second substrate 14, or distributed at each of the pixel regions. In FIG. 1 and FIG. 2, the phosphor layer 40 is formed on the entire light emitting region of the second substrate 14.

The reflective layer 42 may be made of an aluminum layer having a thickness of several thousand Å, and include fine holes for passing through an electron beam. The reflective layer 42 reflects visible light, which is emitted toward the first substrate 12 among the visible light emitted from the phosphor layer 40, back to the second substrate 14. Therefore, luminance of the light emission device 101 is improved.

It is possible to omit the anode electrode 38, and the reflective layer 42 may operate as the anode electrode 38 by receiving the anode voltage.

Further, spacers (not shown) are located between the first substrate 12 and the second substrate 14 for supporting the compression force applied to the vacuum panel and regularly sustaining a gap between the substrates 12, 14.

The light emission device 101 is driven by applying a scan driving voltage to either of the cathode electrodes 24 and the gate electrodes 26, applying a data driving voltage to the other electrodes, and applying an anode voltage that is higher than about several thousand volts to the anode electrode 38.

An electric field is formed around the electron emission regions 22 in pixels where a voltage difference between the cathode electrode 24 and the gate electrode 26 is larger than a threshold value. Thus, electrons are emitted therefrom. The emitted electrons are attracted by the anode voltage applied at the anode electrode 38 and collide with the phosphor layer 40, thereby emitting light. Luminance of the phosphor layer 40 per pixel corresponds to an electron emission amount of a corresponding pixel.

Since the mesh unit 32 of the gate electrode 26 is located on the electron emission region 22, electrons emitted from the electron emission region 22 reach the phosphor layer 40 with a minimized beam spread after passing through the openings 30 of the mesh unit 32. Therefore, the light emission device 101 effectively suppresses an electric charge from being formed at the side wall of the recess 28 by reducing the initial angle spread of the electron beam.

As a result, the light emission device 101 according to the present exemplary embodiment is stably driven by improving the withstanding voltage characteristic of the cathode electrodes 24 and the gate electrodes 26, and provides high luminance by applying a high voltage to the anode electrode 38, for example a voltage higher than 10 kV, or in an exemplary embodiment, about 10 to 15 kV.

Since it is possible to omit a thick film process for forming an insulation layer and a thin film process for forming the gate electrodes in the light emission device 101 according to the present exemplary embodiment, the manufacturing process can be simplified. Further, the light emission device 101 according to the present embodiment can be easily manufactured because the alignment characteristic is not seriously considered when the gate electrodes 26 are located.

Furthermore, it is possible to prevent the cathode electrodes 24 from being short circuited to the gate electrodes 26 by conductive electron emission materials while forming the electron emission regions 22 because the gate electrodes are situated after forming the electron emission regions 22.

Figure 5:
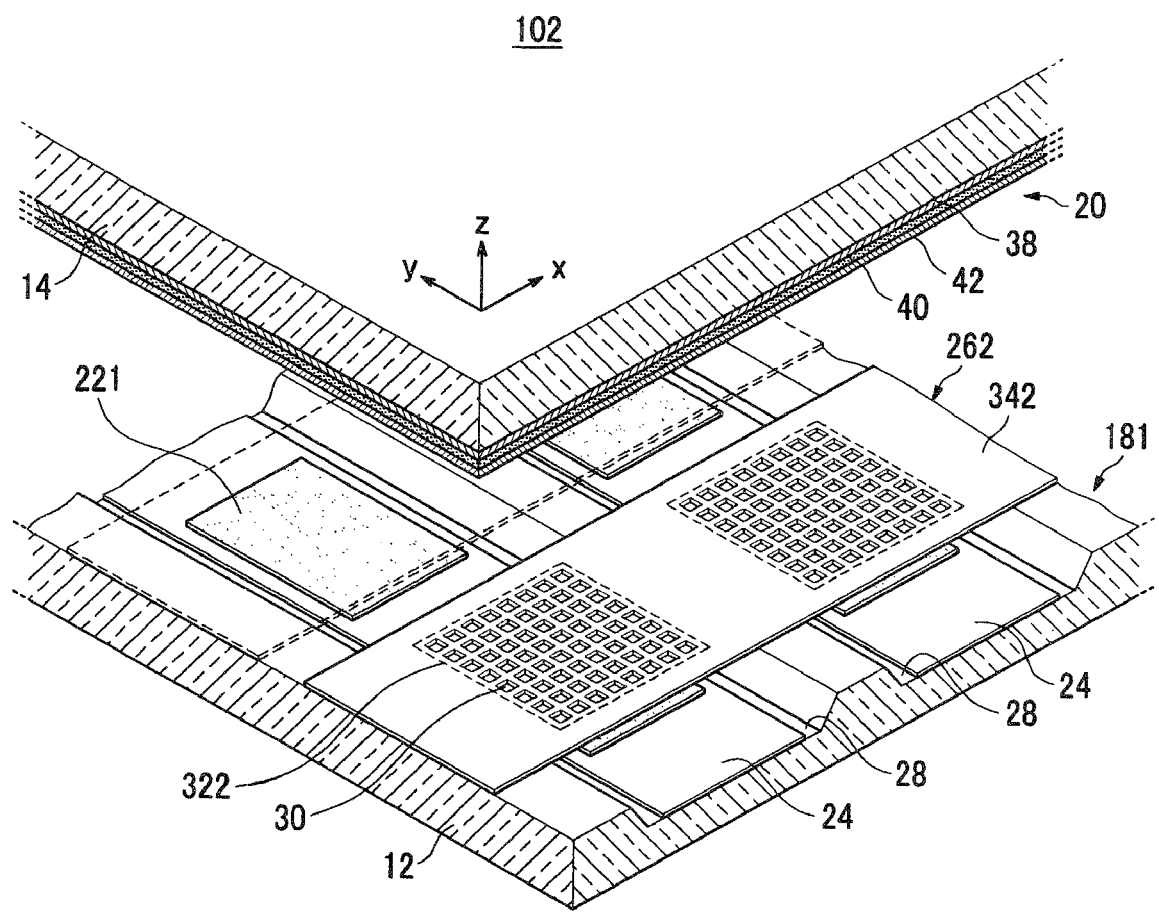
FIG. 5 is a partial cut-away perspective view of a light emission device according to a second exemplary embodiment of the present invention.

FIG. 5 is a partial cut-away perspective view of a light emission device according to a second exemplary embodiment of the present invention.

Referring to FIG. 5, the light emission device 102 according to the present exemplary embodiment has a similar configuration as the light emission device according to the first embodiment, except that electron emission regions 221 are selectively formed at crossing areas of cathode electrodes 24 and gate electrodes 262 and that mesh units 322 of the gate electrodes 262 are also selectively formed at crossing areas of the cathode electrodes 24 and gate electrodes 262. In FIG. 5, reference numeral 181 denotes an electron emission unit. Like reference numerals denote like elements in the light emission devices according to the first and second exemplary embodiments.

The mesh units 322 of the gate electrodes 262 are at a predetermined distance in a length direction of the gate electrode 262 and a supporting member 342 is between the mesh units 322. Therefore, it is possible to suppress a voltage drop of the gate electrode 262 when the light emission device 102 is driven by lowering line resistance of the gate electrode 262.

Figure 6:
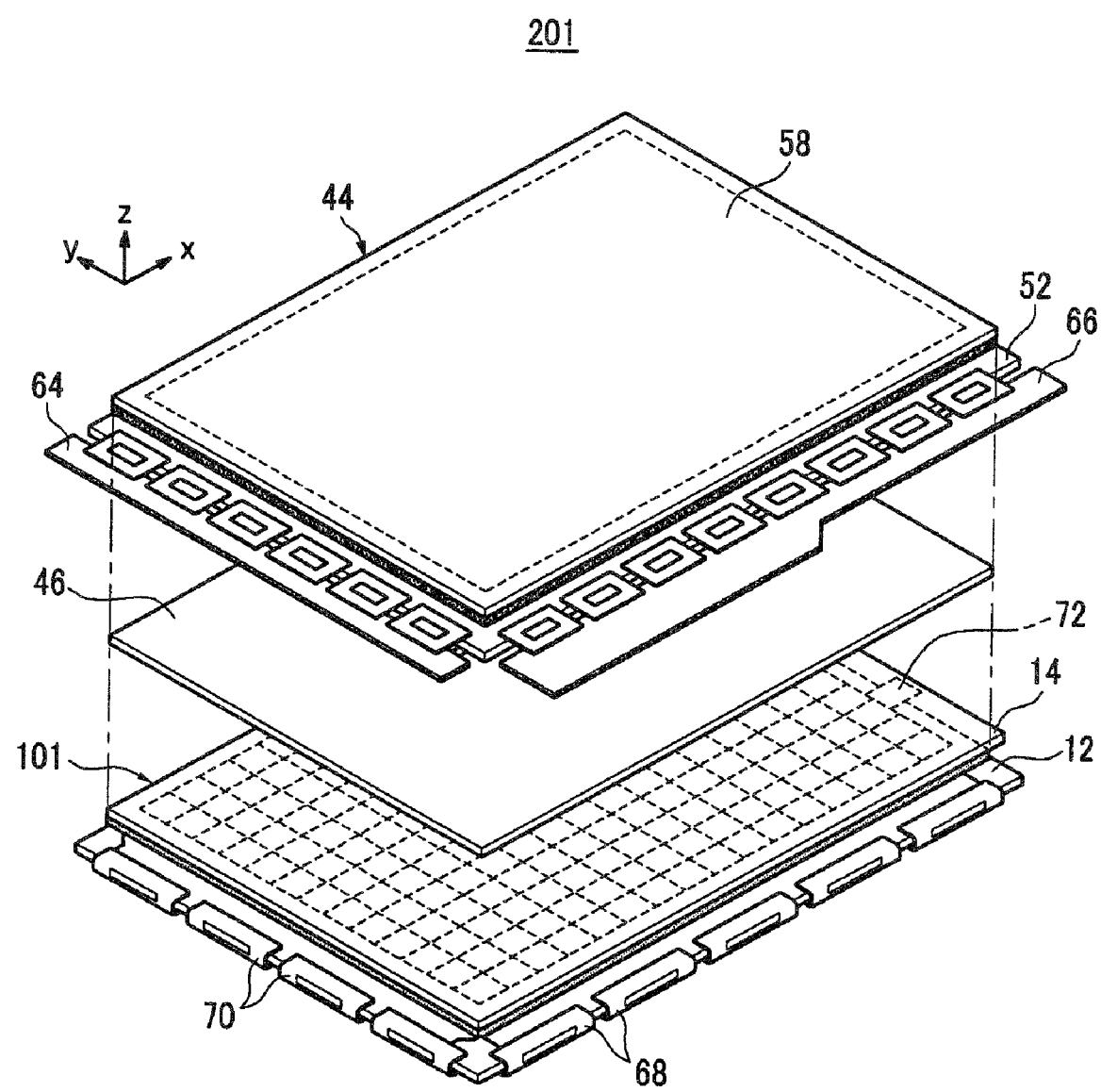
FIG. 6 is an exploded perspective view of a display device according to a third exemplary embodiment of the present invention.
Figure 7:
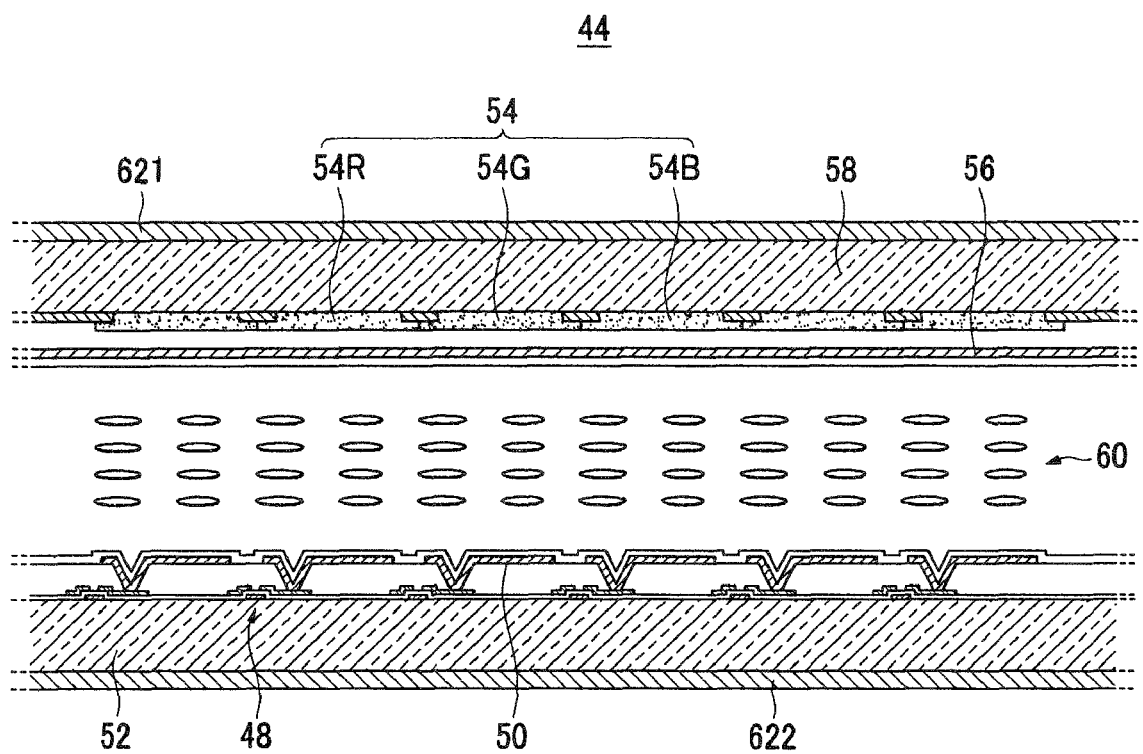
FIG. 7 is a partial cross-sectional view of a display panel shown in FIG. 6.

FIG. 6 is an exploded perspective view of a display device according to a third exemplary embodiment of the present invention, and FIG. 7 is a cross-sectional view of a display panel shown in FIG. 6.

Referring to FIG. 6, the display device 201 according to the present exemplary embodiment includes a light emission device 101 and a display panel 44 in the front of the light emission device 101. A light diffuser 46 may be between the light emission device 101 and the display panel 44 for uniformly diffusing light outputted from the light emission device 101. The light diffuser 46 is separated from the light emission device 101 by a predetermined distance.

The display device 201 may include the light emission device 101,102 according to the first exemplary embodiment or the second exemplary embodiment as a light source. For example, FIG. 6 shows the display device 201 including the light emission device 101 according to the first exemplary embodiment.

The display panel 44 may be a liquid crystal display panel or another non-self luminous display panel. Hereinafter, the display device 201 will be described to have a liquid crystal display panel as the display panel 44.

Referring to FIG. 7, the display panel 44 includes a lower substrate 52 having thin film transistors (TFTs) 48 and pixel electrodes 50, an upper substrate 58 having a color filter layer 54 and a common electrode 56, and a liquid crystal layer 60 injected between the upper substrate 58 and the lower substrate 52. Polarizing plates 621, 622 are adhered on an upper side of the upper substrate 58 and a lower side of the lower substrate 52 for polarizing light that passes through the display panel 44.

One pixel electrode 50 is at each sub-pixel in a one by one manner, and is controlled by the TFT 48. The pixel electrodes 50 and the common electrode 56 are made of a transparent conductive material. The color filter layer 54 includes a red filter layer 54R, a green filter layer 54G, and a blue filter layer 54B, at each sub-pixel.

When a TFT 48 of a predetermined sub-pixel is turned on, an electric field is formed between the pixel electrode 50 and the common electrode 56. Due to the electric field, an alignment angle of liquid crystal molecules is changed and light transmittance is also changed according to the changed alignment angle. The display panel 44 can control luminance and light emitting color of each pixel through the above-described process.

Referring to FIG. 6 again, a gate circuit board assembly 64 transmits a gate driving signal to a gate electrode of each TFT, and a data circuit board assembly 66 transmits a data driving signal to a source electrode of each TFT.

The light emission device 101 includes fewer pixels than pixels in the display panel 44. That is, one pixel of the light emission device 101 corresponds to two or more pixels of the display panel 44.

Each pixel of the light emission device 101 can emit light corresponding to grayscales of corresponding pixels of the display panel 44. For example, each pixel of the light emission device 101 can emit light corresponding to the highest grayscale among grayscales of the pixels of the display panel 44. Each pixel of the light emission device 101 can be expressed as a 2 to 8-bit grayscale.

For convenience, a pixel of the display panel 44 is referred as a first pixel, and a pixel of the light emission device 101 is referred as a second pixel. First pixels corresponding to one second pixel are referred to as a first pixel group.

The light emission device 101 may be driven as follows. A signal controller (not shown) for controlling the display panel 44 detects the highest grayscale among grayscales of the first pixels in a first pixel group. A grayscale, which is required to emit by the second pixel, is transformed to digital data according to the detected grayscale. A driving signal of the light emission device 101 is generated using the digital data. Then, the generated driving signal is applied to the driving electrodes of the light emission device 101.

The driving signal of the light emission device 101 includes a scan driving signal and a data driving signal. Either of the cathode electrodes 24 and the gate electrodes 26, for example the gate electrodes, receives a scan driving signal. The other, for example the cathode electrodes, receives a data driving signal.

A scan circuit board assembly and a data circuit board assembly may be at the rear side of the light emission device 101 for driving the light emission device 101. In FIG. 6, a first connector 68 connects the cathode electrodes and the data circuit board assembly, and a second connector 70 connects the gate electrodes and the scan circuit board assembly. Further, a third connector 72 is provided for applying an anode voltage to the anode electrode.

The second pixel of the light emission device 101 is synchronized to the first pixel group and emits light at a predetermined grayscale when an image is displayed at the first pixel group corresponding to the second pixel of the light emission device 101. That is, the light emission device 101 provides high luminous light to a bright region and low luminous light to a dark region in a screen displayed by the display panel 44. Therefore, the display device 201 according to the present exemplary embodiment improves the contrast ratio of a screen and provides superior image quality.

Figure 8:
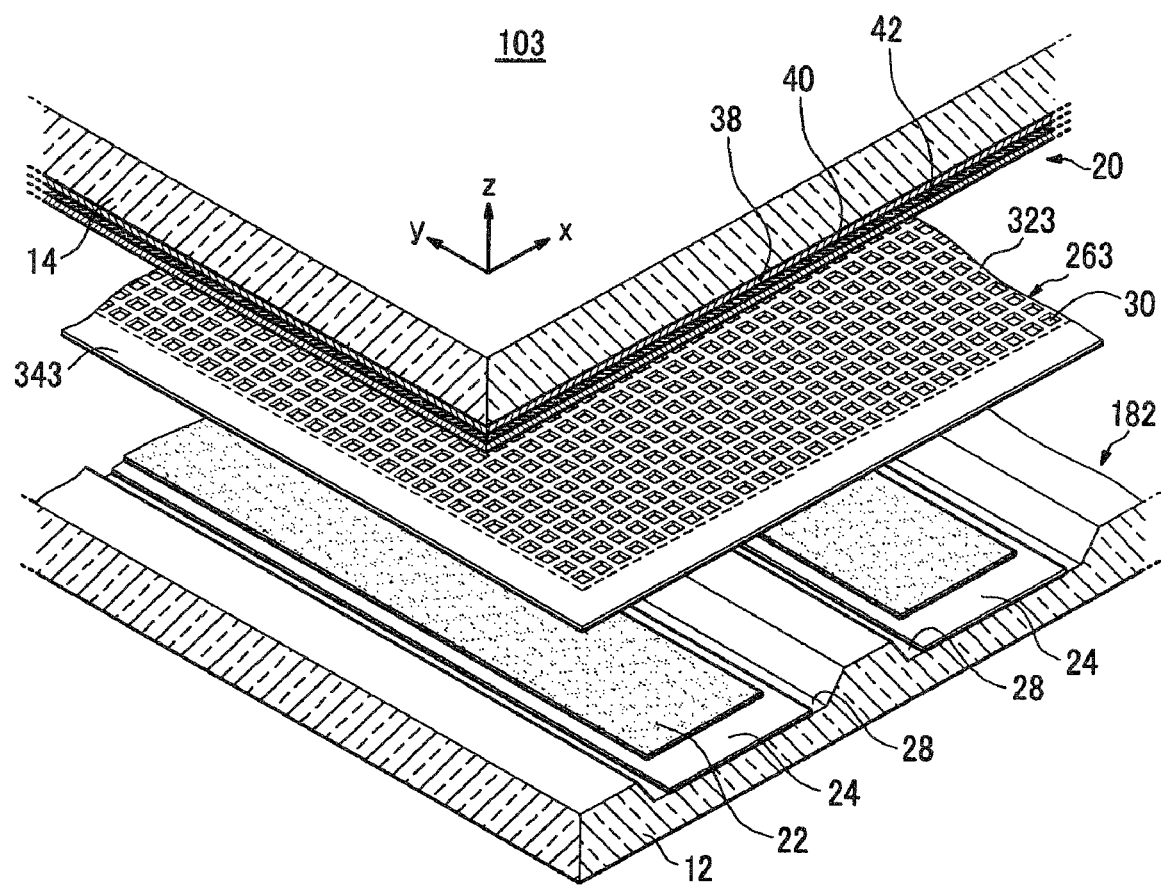
FIG. 8 is an exploded perspective view of a light emission device according to a fourth exemplary embodiment of the present invention.

FIG. 8 is an exploded perspective view of a light emission device according to a fourth exemplary embodiment of the present invention.

Referring to FIG. 8, the light emission device 103 according to the present exemplary embodiment has a similar configuration as the light emission device 101 according to the first exemplary embodiment, except that a gate electrode 263 is made of a single metal plate and that one mesh unit 323 is formed over electron emission unit 182 corresponding to the entire light emitting region. Like reference numerals denote like elements in the light emission devices according to the first and fourth exemplary embodiments.

The light emission device 103 according to the present exemplary embodiment is driven by applying a common cathode voltage to cathode electrodes 24, applying a gate voltage, which is several or several tens of volts higher than the cathode voltage, and applying several thousand volts of anode voltage to the anode electrode 38. Then, the electron emission regions 22 simultaneously emit electrons, thereby exciting the phosphor layer 40 to emit light.

The light emission device 103 realizes uniform luminance at the entire phosphor layer 40, and the luminance of the phosphor layer 40 is controlled by controlling a difference between the cathode voltage and the gate voltage or controlling the anode voltage.

Figure 9:
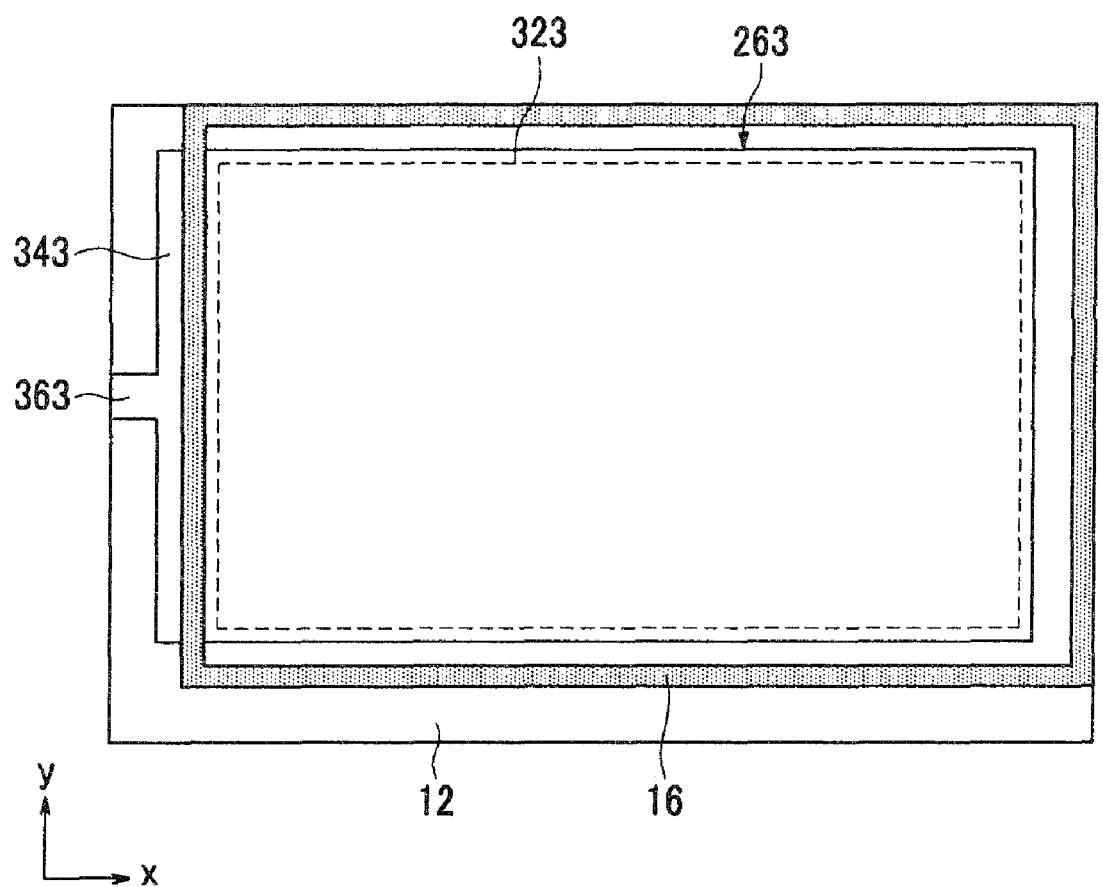
FIG. 9 and FIG. 10 are schematic diagrams illustrating a first substrate, a gate electrode, and a sealing member in the light emission device according to the fourth exemplary embodiment of the present invention.
Figure 10:
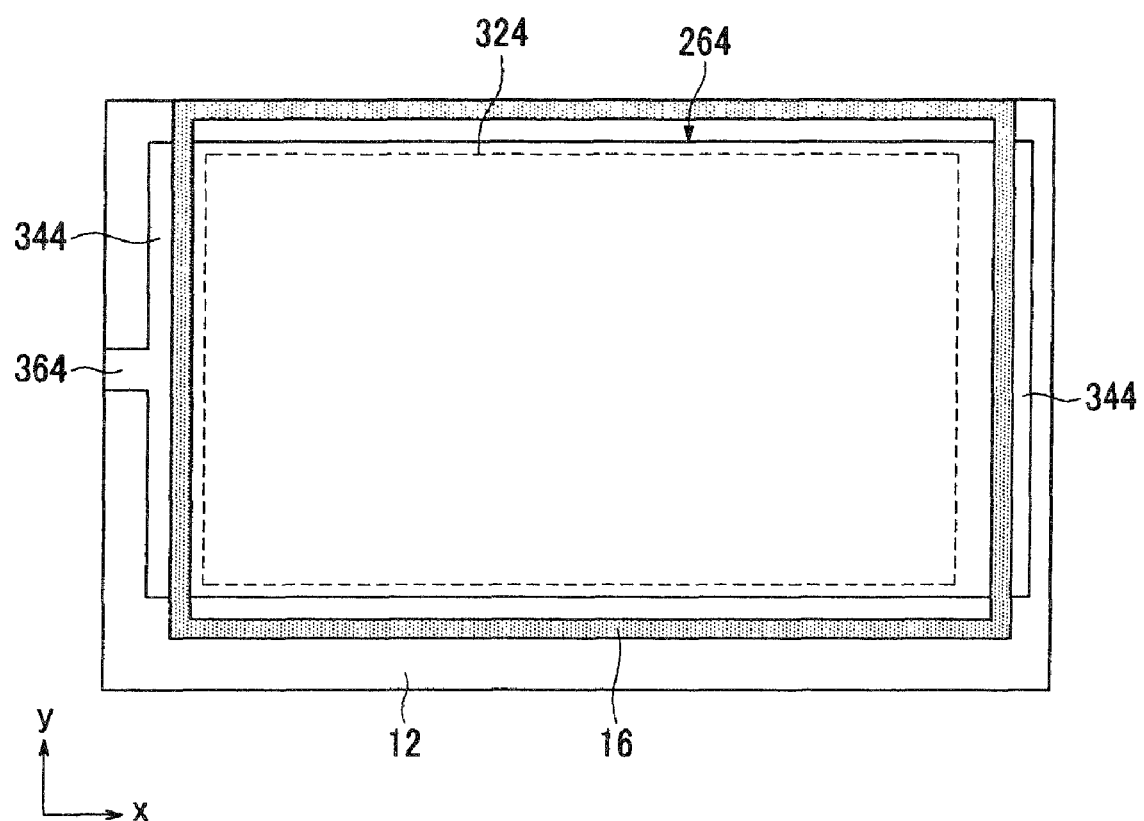

The gate electrode 263 can be fixed at the first substrate 12 using the sealing member without an additional means. FIG. 9 and FIG. 10 are schematic diagrams illustrating a first substrate, a gate electrode, and a sealing member in the light emission device according to the fourth exemplary embodiment of the present invention.

Referring to FIG. 9, in a gate electrode 263, a terminal 363 is formed at one edge of a supporting member 343, and a sealing member 16 crosses the supporting member 343 between the terminal 363 and a mesh unit 323. Therefore, the gate electrode 263 exposes one side edge of the supporting member 343 connected to the terminal 363 to the outside of the sealing member 16. The gate electrode 263 is fixed at the first substrate 12 by the adhesive force and the compression force of the sealing member 16.

Referring to FIG. 10, the sealing member 16 according to another exemplary embodiment may cross not only the supporting member 344 between the terminal 364 and the mesh unit 324, but also the supporting member 344 of the opposite edge. Therefore, the gate electrode 264 exposes two edges of the supporting member 344 to the outside of the sealing member 16, and may be fixed at the first substrate 12 by the adhesive force and the compression force of the sealing member 16.

Figure 11:
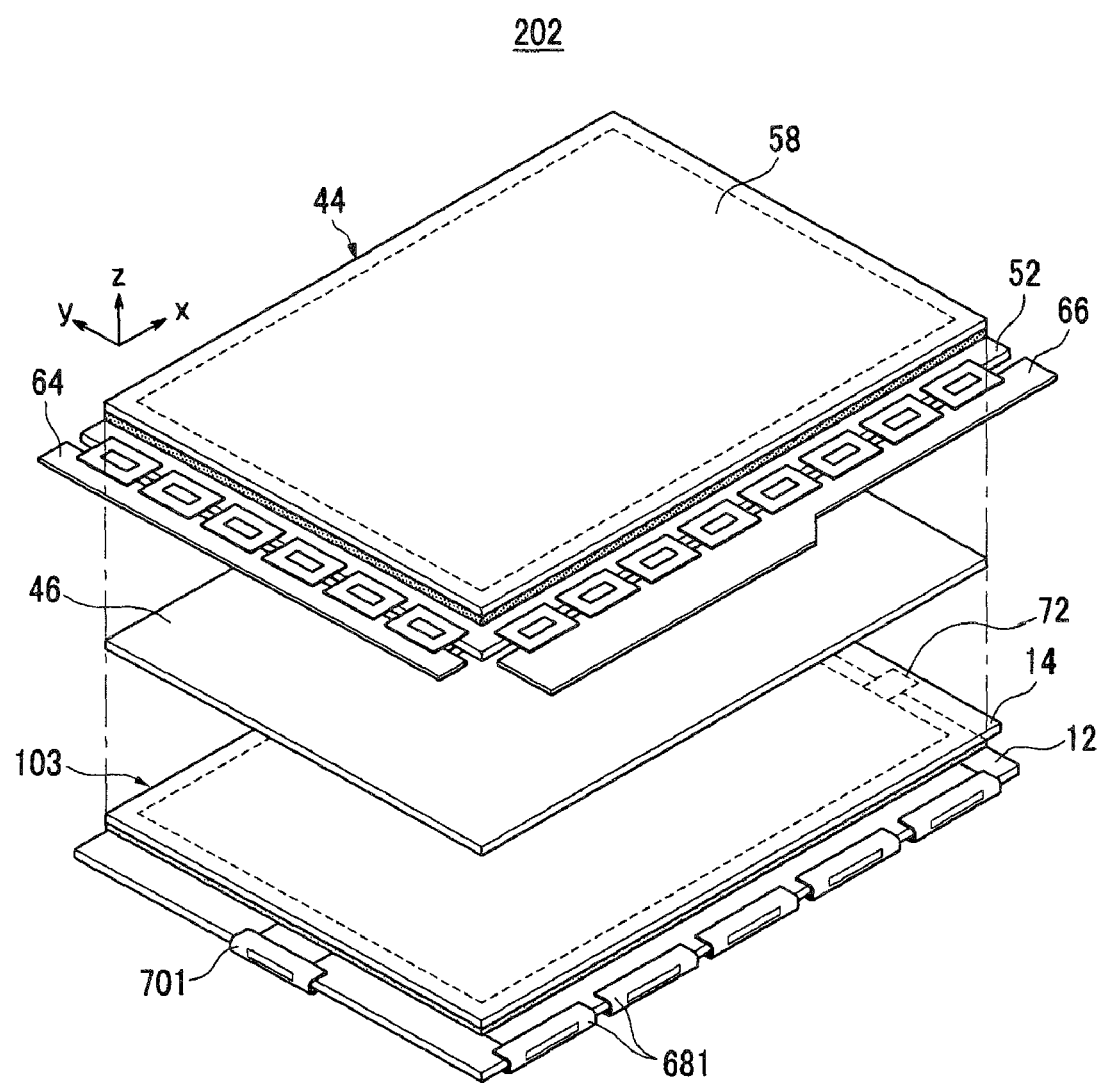
FIG. 11 is an exploded perspective view of a display device according to a fifth exemplary embodiment of the present invention.

FIG. 11 is an exploded perspective view of a display device according to a fifth exemplary embodiment of the present invention.

Referring to FIG. 11, a display device 202 according to the present exemplary embodiment has a similar configuration as the display device according to the third exemplary embodiment, except that the display device 202 includes a light emission device 103 according to the fourth exemplary embodiment as a light source. Like reference numerals denote like elements in the display devices according to the third and rirth exemplary embodiments.

In FIG. 11, a first connector 681 is provided for applying a cathode voltage to cathode electrodes, and a second connector 701 is provided for applying a gate voltage to a gate electrode.

Figure 12:
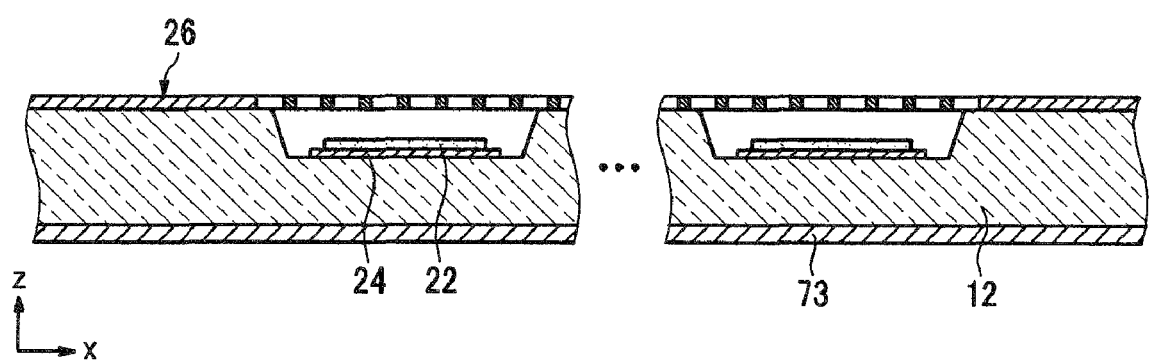
FIG. 12 is an enlarged cross-sectional view of a part of a light emission device according to a sixth exemplary embodiment of the present invention.

FIG. 12 is an enlarged cross-sectional view of a part of a light emission device according to a sixth exemplary embodiment of the present invention.

Referring to FIG. 12, the light emission device 104 according to the present exemplary embodiment has a similar configuration as the light emission device according to one of the first, second, and fourth exemplary embodiments, except that it has a structure that improves adhesive force of the gate electrode 26 to the first substrate 12 by adhering a magnetic sheet 73 at an outer surface of the first substrate 12. For convenience, the reference numeral of a gate electrode is identical to that of the light emission device according to the first exemplary embodiment.

The magnetic sheet 73 may be formed to have the same size of the first substrate 12 and to have a predetermined level of magnetic force that does not influence a trace of an electron beam. The magnetic sheet 73 firmly fixes the gate electrode 26 to the first substrate 12 by attracting the gate electrode 26.

Figure 13:
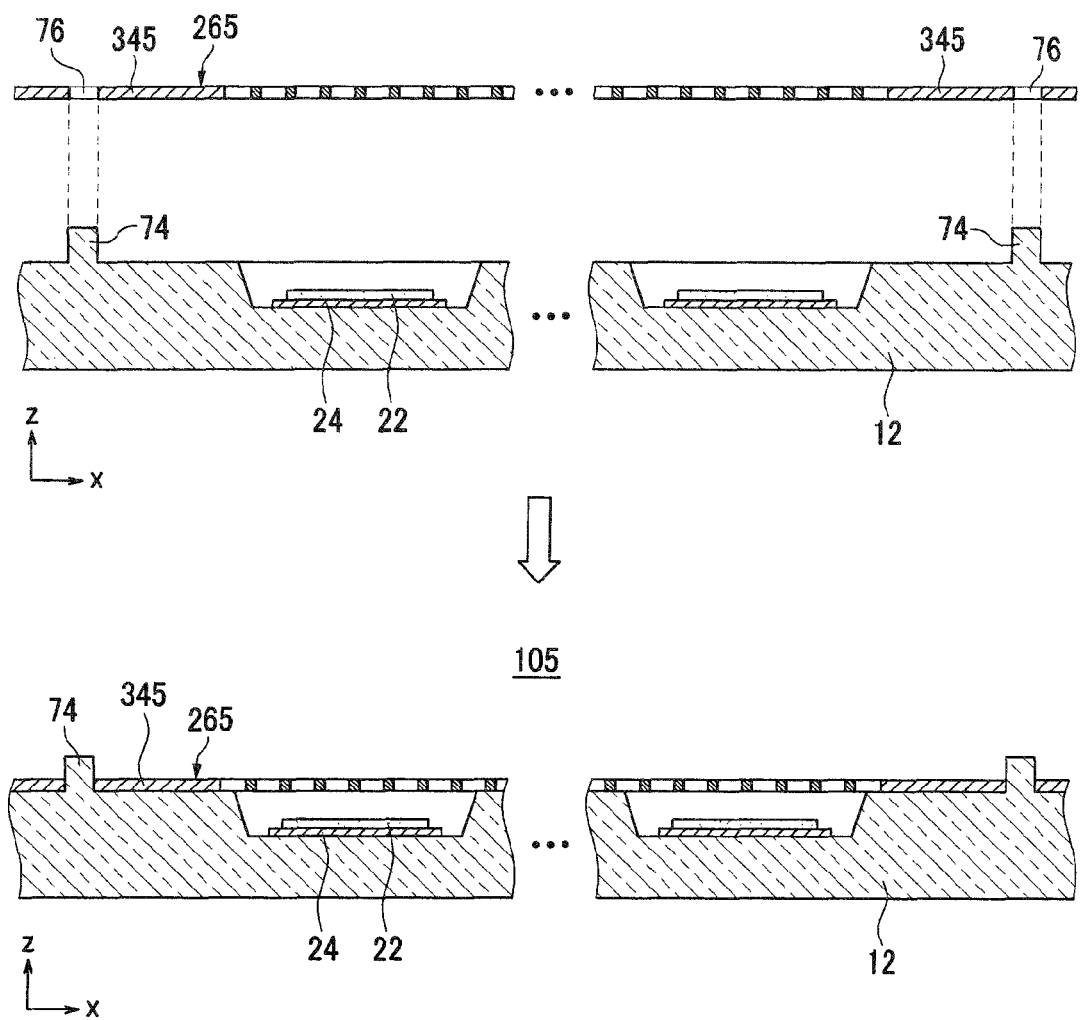
FIG. 13 is an enlarged cross-sectional view of a part of a light emission device according to a seventh exemplary embodiment of the present invention.

FIG. 13 is a enlarged cross-sectional view of a part of a light emission device according to a seventh exemplary embodiment of the present invention.

Referring to FIG. 13, the light emission device 105 according to the present exemplary embodiment has a similar configuration as one of the light emission devices according to the first, second, and fourth exemplary embodiments, except that a first substrate 12 forms a protrusion 74 toward a second substrate and that a supporting member 345 of a gate electrode 265 forms a through-hole 76 corresponding to the protrusion 74.

The protrusion 74 of the first substrate 12 is at the inner side of the sealing member 16 seen in FIG. 2, and a pair of the protrusions 74 are provided in a direction vertically crossing the cathode electrode 24 (x-axis direction in the drawing). The protrusion 74 is inserted into the through-hole 76 formed at the supporting member 345, thereby firmly fixing both ends thereof to the first substrate 12. Therefore, it is possible to prevent shaking and position variation.

Figure 14:
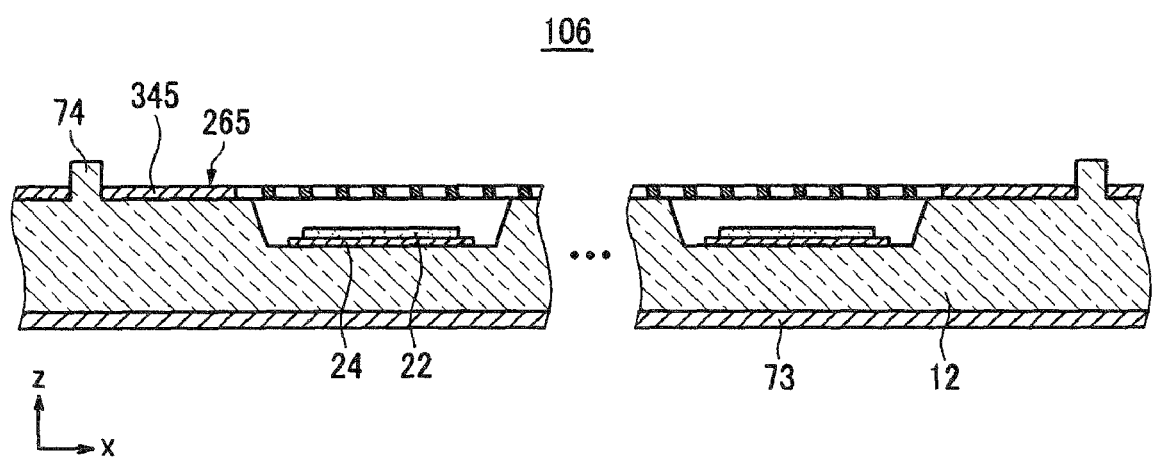
FIG. 14 is an enlarged cross-sectional view of a part of a light emission device according to an eighth exemplary embodiment of the present invention.

FIG. 14 is a enlarged cross-sectional view of a part of a light emission device according to an eighth exemplary embodiment of the present invention.

Referring FIG. 14, the light emission device 106 according to the present exemplary embodiment has a similar configuration as the light emission device according to the seventh exemplary embodiment, except for a magnetic sheet 73 adhered to the outside of the first substrate 12. Since the structure and the function of the magnetic sheet 73 are identical to those of the magnetic sheet 73 according to the sixth exemplary embodiment, a detailed description thereof is omitted.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A light emission device comprising:
 a vacuum panel having a first substrate and a second substrate facing each other, and having a sealing member between a planar surface of the first substrate and the second substrate, the first substrate having recesses into the planar surface of the first substrate facing the second substrate;
 cathode electrodes located below the planar surface in corresponding ones of the recesses, each of the recesses having a planar bottom surface that is parallel to the planar surface;
 electron emission regions on corresponding ones of the cathode electrodes;
 a gate electrode fixed at one side of the first substrate and spaced apart from the electron emission regions, the gate electrode including a mesh unit having openings through which an electron beam passes and a supporting member surrounding the mesh unit; and a light emission unit at a side of the second substrate facing the first substrate, wherein the thickness of the first substrate at the planar bottom surface of each of the recesses is substantially constant and is less than the thickness of the first substrate at portions other than the recesses.

2. The light emission device of claim 1, wherein the recesses have a recess width wider than a width of the cathode electrodes and a recess depth greater than a sum of thicknesses of the cathode electrodes and the electron emission regions.

3. The light emission device of claim 1, wherein the gate electrode is made of a metal plate having a thickness greater than a thickness of the cathode electrodes.

4. The light emission device of claim 3, wherein an edge of the gate electrode is exposed to an outside of the sealing member, and the gate electrode is fixed at the first substrate under pressure from the sealing member.

5. The light emission device of claim 3, wherein the gate electrode is made of a plurality of metal plates and the metal plates are spaced apart in a stripe pattern along a direction crossing the cathode electrodes.

6. The light emission device of claim 5, wherein the mesh unit is in each of the metal plates.

7. The light emission device of claim 5, wherein the mesh unit corresponds to crossing areas of the cathode electrodes and the gate electrode.

8. The light emission device of claim 3,
wherein the first substrate and the second substrate include a light emitting region and a non-light emitting region,
wherein the gate electrode is made of a single metal plate, and
wherein the mesh unit corresponds with an entire light emitting region.

9. The light emission device of claim 3, further comprising a magnetic sheet adhered on an other side of the first substrate for fixing the gate electrode at the first substrate.

10. The light emission device of claim 3, wherein the first substrate includes a protrusion and the supporting member of the gate electrode has a through-hole corresponding to the protrusion, the protrusion being insertable into the through-hole.

11. The light emission device of claim 10, further comprising a magnetic sheet adhered on an other side of the first substrate for fixing the gate electrode at the first substrate.

12. A display device comprising:
a display panel for displaying an image; and
a light emission device for providing light to the display panel,
wherein the light emission device comprises:
a vacuum panel having a first substrate and a second substrate facing each other and a sealing member between a planar surface of the first substrate and the second substrate, the first substrate having recesses into the planar surface of the first substrate facing the second substrate;
cathode electrodes located below the planar surface in corresponding ones of the recesses, each of the recesses having a planar bottom surface that is parallel to the planar surface;
electron emission regions on corresponding ones of the cathode electrodes;
a gate electrode fixed at one side of the first substrate and spaced apart from the electron emission regions, the gate electrode including a mesh unit having openings through which an electron beam passes and a supporting member surrounding the mesh unit; and
a light emission unit at a side of the second substrate facing the first substrate, and
wherein the thickness of the first substrate at the planar bottom surface of each of the recesses is substantially constant and is less than the thickness of the first substrate at portions other than the recesses.

13. The display device of claim 12, wherein the gate electrode is made of a metal plate having a thickness greater than a thickness of the cathode electrodes.

14. The display device of claim 13, wherein an edge of the gate electrode is exposed to an outside of the sealing member, and the gate electrode is fixed at the first substrate under pressure from the sealing member.

15. The display device of claim 13, wherein the gate electrode is made of a plurality of metal plates, the metal plates being spaced apart in a stripe pattern along a direction crossing the cathode electrodes.

16. The display device of claim 15, wherein the mesh unit is in each of the metal plates.

17. The display device of claim 15, wherein the mesh unit corresponds to crossing areas of the cathode electrodes and the gate electrode.

18. The display device of claim 15,
wherein the display panel includes first pixels,
wherein the light emission device includes fewer second pixels than the first pixels, and
wherein each of the second pixels independently emits light corresponding to grayscales of corresponding first pixels.

19. The display device of claim 18, wherein the second pixels emit light corresponding to a highest grayscale among grayscales of the corresponding first pixels.

20. The display device of claim 13,
wherein the first substrate and the second substrate include a light emitting region and a non-light emitting region,
wherein the gate electrode is made of a single metal plate, and
wherein the mesh unit corresponds to an entire light emitting region.

21. The display device of claim 13, wherein the light emission device further comprises a magnetic sheet adhered on an other side of the first substrate for fixing the gate electrode at the first substrate.

22. The display device of claim 13,
wherein the first substrate includes a protrusion,
wherein the supporting member of the gate electrode includes a through-hole corresponding to the protrusion, and
wherein the protrusion is insertable into the through-hole.

23. The display device of claim 12, wherein the display panel is a liquid crystal display panel.

* * * * *